United States Patent [19]
Ishikawa

[11] 3,727,714
[45] Apr. 17, 1973

[54] AUTOMATIC CONSTANT SPEED DRIVING SYSTEM FOR AUTOMOBILES

[75] Inventor: Toshio Ishikawa, Kariya, Japan

[73] Assignee: Nippondenso Kabrishiki Kaisha, Aichi-ken, Japan

[22] Filed: Nov. 3, 1970

[21] Appl. No.: 86,400

[30] Foreign Application Priority Data

| Nov. 25, 1969 | Japan | 44/94822 |
| Nov. 25, 1969 | Japan | 44/94823 |
| Dec. 1, 1969 | Japan | 44/96425 |
| Dec. 1, 1969 | Japan | 44/96427 |

[52] U.S. Cl. ............180/108, 123/102, 123/103 E, 180/110
[51] Int. Cl. ............................................B60k 31/00
[58] Field of Search..................180/109, 110, 105 R, 180/105 E, 106, 107, 108; 123/102, 103 E

[56] References Cited

UNITED STATES PATENTS

| 3,016,048 | 1/1962 | Joline | 123/102 X |
| 3,392,799 | 7/1968 | Ishikawa | 180/109 X |
| 3,216,522 | 11/1965 | Cassano | 180/109 |
| 3,207,255 | 9/1965 | Hahlganss et al. | 180/109 X |
| 2,971,596 | 2/1961 | Davis et al. | 180/109 |
| 3,157,807 | 11/1964 | Kimberly, Jr. | 180/105 E |

Primary Examiner—Kenneth H. Betts
Assistant Examiner—John P. Silverstrim
Attorney—Cushman, Darby & Cushman

[57] ABSTRACT

An automatic constant speed driving system for automobiles comprising a speed detecting unit for generating a signal proportional to the car speed, means for actuating an engine throttle, and a speed setting magnetic clutch capable of connecting the speed detecting unit and the engine throttle actuating means with each other at any given car speed, whereby when the magnetic clutch is in the coupled position, the speed detecting unit is caused to store as a set speed the displacement of the throttle actuating means proportional to the car speed and this set speed is compared with the detected speed so that the throttle actuating means is operated so as to effect the constant speed driving of the vehicle.

6 Claims, 10 Drawing Figures

INVENTOR

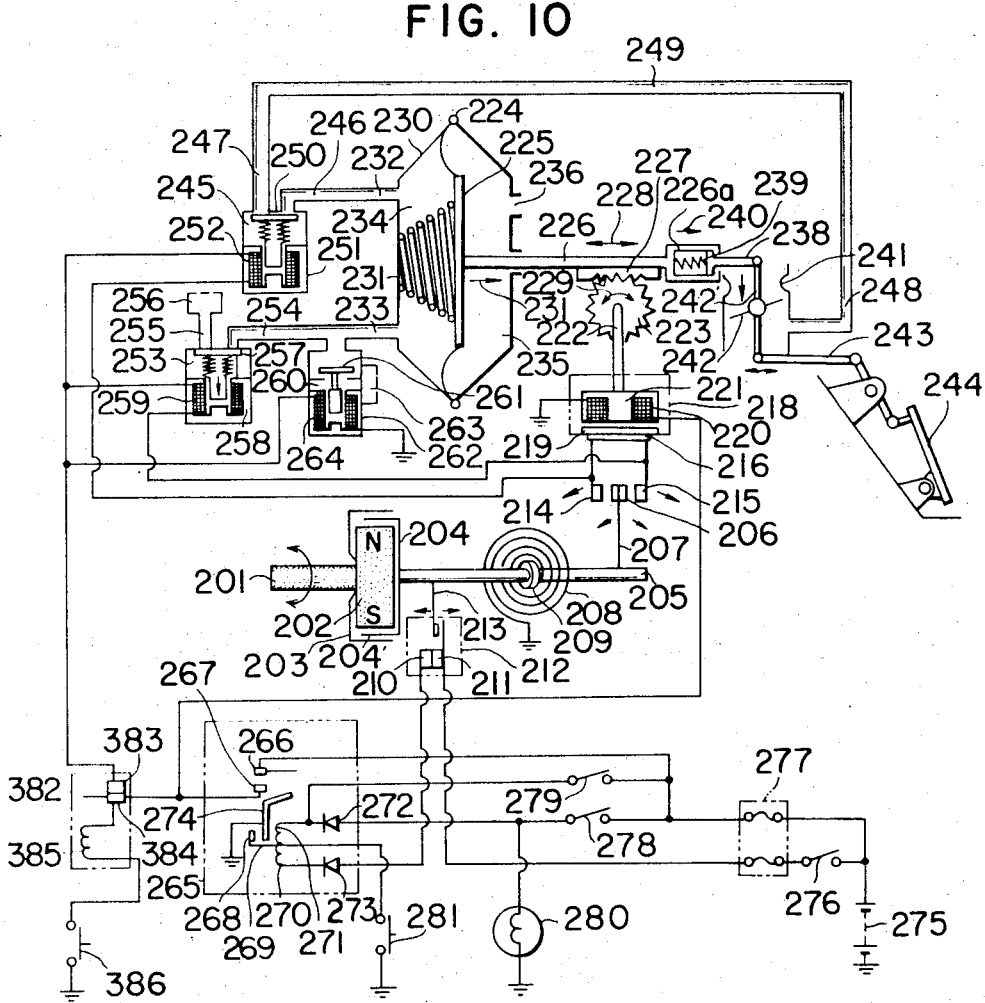

AUTOMATIC CONSTANT SPEED DRIVING SYSTEM FOR AUTOMOBILES

BACKGROUND OF THE INVENTION

1. Field of the Invention

The present invention relates to an automatic constant speed driving system which detects the speed of a car so that the opening of a throttle valve is automatically varied in accordance with road condition changes so as to maintain the car speed at a set speed.

2. Description of the Prior Art

In the past, in order to bring an automatic constant speed driving system of this type into action, a speed setting dial installed at the driver's seat was first set at the desired speed and the car speed was then increased up to near the set speed by means of an accelerator pedal, whereupon a setting button was operated so as to enable the system to bring the vehicle into the automatic constant speed mode of driving. However, this conventional system had a disadvantage in that when effecting a speed setting or changing the set speed while the vehicle was being driven, the driver had to change his attention from the ahead to the setting dial for a while so that chances were great that there would be an attendant danger, particularly when the vehicle was being driven at high speeds where the automatic constant speed driving system was most needed. There was another disadvantage in that the reading on a speedometer and the scale of a speed setting dial would not readily coincide with each other due to fluctuations in the performance characteristics of the speedometer and the automatic constant speed driving system.

SUMMARY OF THE INVENTION

In order to solve the deficiencies of the conventional systems described above, the present invention has for its object the provision of an automatic constant speed driving system comprising a speed detecting unit for producing a signal proportional to the car speed, means for actuating an engine throttle using a reversible motor or a diaphragm mechanism, and a speed setting magnetic clutch capable of connecting the throttle actuating means and the speed detecting the throttle actuating means and the speed detecting unit with each other at any given car speed, whereby instead of effecting the required speed setting by means of a dial, a setting button switch mounted by either the driver's seat or on the steering wheel is pressed so as to bring the magnetic clutch into the coupling position so that the speed detecting unit is caused to store as the set speed the displacement of the throttle actuating means proportional to the car speed and this set speed is then compared with the detected speed to operate the throttle actuating means, thereby ensuring the constant speed driving of the vehicle through a simple process of operation.

Other objects, features and advantages of the present invention will be readily apparent from the following detailed descriptions of the preferred embodiments of the invention taken in conjunction with the accompanying drawings.

BRIEF DESCRIPTION OF THE DRAWINGS

FIG. 10 is a schematic view showing the principles and wiring system of a fourth embodiment of the system according to the present invention.

DESCRIPTION OF THE PREFERRED EMBODIMENTS

The present invention will now be explained hereunder with reference to the illustrated embodiments.

Embodiment 1

Figure 3:
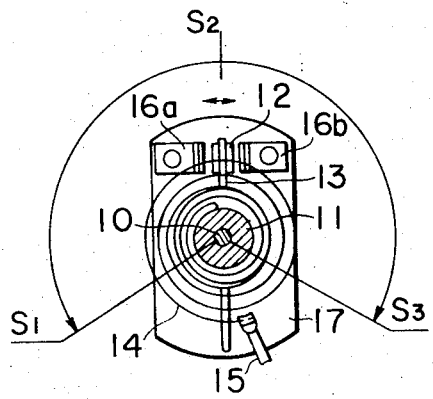
FIG. 3 is a sectional view taken along line III — III of FIG. 1.
Figure 4:
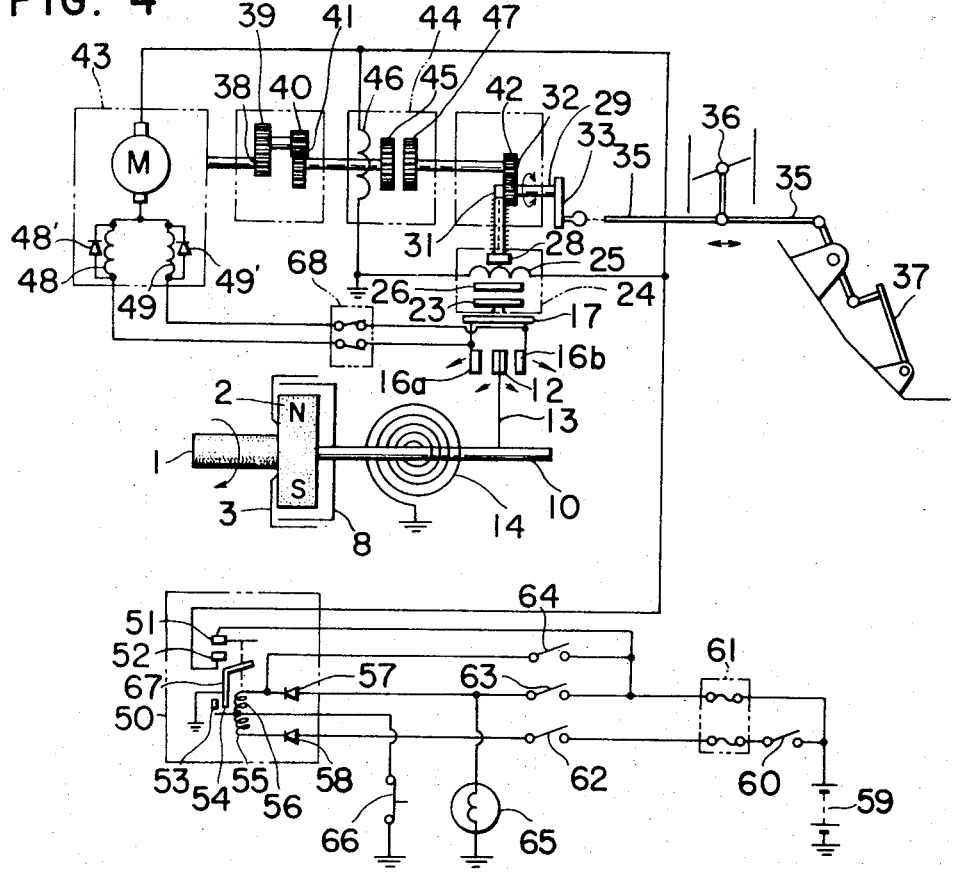
FIG. 4 is an electrical wiring diagram of the first embodiment.

In FIGS. 1 through 4, numeral 1 is a magnet shaft to which is applied a turning effort by means of a cable from the transmission or the like, so that this magnet shaft rotates in proportion to the car speed, and the magnet shaft 1 has secured thereto a rotary magnet 2 which retains its magnetism by means of a suitable number of magnetic poles, a yoke 3 providing a magnetic circuit for the magnet 2 and a temperature compensating magnetic compensation plate 4, and a bearing 5 is further secured to the top of the shaft 1. The magnet shaft 1 is rotatably received within a body boss 7 through the intermediary of a bearing 6. Numeral 8 designates a cup-shaped rotor securely mounted on a rotor shaft 10 which is supported by the bearings 5 and 9, and its cylindrical portion 8a is inserted in the magnetic circuit formed by the rotary magnet 2 and the yoke 3 such that when the rotary magnet 2 and the yoke 3 are rotated by the magnet shaft 1, a torque proportional to the rotational speed is produced by an eddy current in the same rotational direction as the yoke 3. On the other hand, the rotor shaft 10 is provided with a boss 11 securely mounted thereon and the boss 11 has securely mounted thereon an armature 13 provided with movable contacts 12 on both sides thereof and a spiral spring 14 which is equally balanced with the torque produced on the rotor 8. One end of the spiral spring 14 is electrically connected to the armature 13 so that it also serves as a conductor for the electric circuit, while the other end of the spring 14 is fixed to a governor end frame 15 so that it is grounded. With this arrangement, the point of balance between the rotating torque produced on the rotor 8 by the rotation of the magnet shaft 1 and the spiral spring 14, that is, the movable contacts 12 are balanced, as shown in FIG. 3, at that position which corresponds to the car speed at that time, which falls within the speed range $S_1$ to $S_3$ so far as the controllable speed range is concerned. Numerals 16a and 16b designate acceleration and deceleration contacts, respectively, which are placed opposite to the movable contacts 12 with a suitable gap therebetween, and both of the contacts 16a and 16b are fixed to a point base 17 of an insulating material such that the contacts 16a and 16b are electrically connected to current carrying spiral springs 18 and 19 by way of the point base 17. Further, each of the current carrying spiral springs 18 and 19 has one end of the wound ends thereof fixed to a terminal base 20 for electrical connection. Numeral 21 designates a bearing forcedly secured in the bore of the point base 17 so that it fits on a point base shaft 22 attached to the body portion so as to rotatably support the point base 17. Also mounted on one end of the point base 17 is a clutch plate 23 of a speed setting magnetic clutch 24, which is slidable in the axial direction and rotatable with the point base 17 as a unit in the circumferential direction. The magnetic clutch 24 comprises, in addition to the clutch plate 23, an exciting coil 25 and a pull-in yoke 26 such that when the magnetic clutch 24 is released, either the contact 16a or 16b is pressed by the contact 12 of the armature 13 in response to the rotation of the rotor 8 so that the point base 17 rotates in operatively associated relation with the rotor 8 in proportion to the rotation of the magnet shaft 1. The pull-in yoke 26 of the magnetic clutch 24 is rotatably supported by the point base shaft 22 on which the pull-in yoke 26 is mounted by means of a bearing 27 forcedly fit into the bore of the yoke 26, while a toothed wheel 28 is provided on the outer periphery of the pull-in yoke 26 so that the toothed wheel 28 engages with a small gear 31 securely mounted on a shaft 30 of a throttle control base 29 so as to rotate the pull-in yoke 26 in association with the throttle control base 29. Numeral 32 designates a sector driving wheel securely mounted on the shaft 30, and numeral 33 designates a throttle control arm rotatably mounted on the shaft 30 of the throttle control base 29 and the arm 33 is secured in tension to the throttle control base 29 by means of a tension spring 34. Here, the throttle control arm 33 constitutes a single-shaft one-way driving means such that the throttle control arm 33 is driven with the throttle control base 29 in one direction by means of a stopper 29a and in the other direction by means of the tension spring 34. The purpose of this tension spring 34 is such that when an accelerator pedal 37 is depressed for acceleration during the automatic constant speed driving, the system of the present invention is prevented from being actuated backward by the accelerator pedal 37. The throttle control arm 33 is connected, as shown in FIG. 4, to a carburetor 36 and the accelerator pedal 37 by way of a link 35. Numerals 38, 39, 40, 41 and 42 designate gears which reduce the output of a reversible motor 43 in cooperation with the sector wheel 32 so as to transmit this reduced speed to the throttle control base 29. Disposed between the gears 41 and 42 is a magnetic clutch 44 for connecting and disconnecting the motor mechanical output of the reversible motor 43 whose speed is reduced by the gears 38, 39 and 40, and this magnetic clutch 44 is composed of a pull-in yoke 45 and an exciting coil 46 disposed on the gear 41 side and a clutch plate 47 disposed on the gear 42 side. The magnetic clutch 44 is arranged in the middle of the speed reducing gear system so as to achieve a reduction in the required torque to be transmitted and hence the miniaturization of the magnetic clutch 44, and both of the magnetic clutches 44 and 24 are so constructed that the supply of current to the exciting coils 46 and 25 is provided externally through the slip rings. On the other hand, the previously mentioned two fixed contacts, i.e., the acceleration and deceleration contacts 16a and 16b are connected such that when the movable contact 12 is closed thereby electrically changing the connection from one of the forward and reverse field coils 48 and 49 of the reversible motor 43 to the other by way of the current carrying spiral springs 18 and 19, the terminal base 20 and a limit switch 68 shown in FIG. 4 and to be explained hereinafter, the motor 43 rotates in a direction in which the engaged contact is opened. Rectifiers 48' and 49' are connected in parallel with the field coils 48 and 49 and are arc extinguishing rectifiers for the contacts 12, 16a and 16b, and the limit switch 68 is provided to open the power supply circuit to the reversible motor 43 when the sector wheel 32 rotates in excess of a predetermined angle, so that the motor 43 is prevented from being burned. On the other hand, the purpose of arranging the acceleration and deceleration contacts 16a and 16b to rotate in association with the throttle control base 29 by means of the magnetic clutch 24 is to provide a so-called minor loop feedback so as to ensure the stable operation of the system.

Next, the wiring diagram of the system of the present invention will be explained with reference to FIG. 4 in which numeral 50 designates a release relay for rendering the system of the present invention operative and inoperative. The relay 50 comprises main contacts 51 and 52, holding contacts 53 and 54, a main exciting coil 55, a counter exciting coil 56, rectifiers 57 and 58, etc., such that when the system is inoperative the main contacts 51 and 52 and the holding contacts 53 and 54 are all opened and when the system is operative the main contact 51 meets the other main contact 52 and the holding contact 54 fastened to the armature 67 meets the other holding contact 53. Numeral 59 designates a battery, 60 an ignition switch, 61 a fuse box. Numeral 62 designates a low speed limit switch associated, for example, with a speedometer such that it operates upon detection of a certain car speed. In the actual operation, the limit switch 62 is opened for safety's sake at a low car speed (at a speed below about 20 to 30 Km/h) so as to forcibly render the system of the present invention inoperative, and the limit switch 62 is closed only at a high speed (at a speed higher than 20 to 30 Km/h) so as to render the system operative through the operation of the release relay 50. Numeral 63 designates a brake switch and 64 designates a clutch switch with the both switches being adapted to be closed upon the depressing of the brake and clutch pedals, respectively. Numeral 65 designates a braking lamp and 66 designates an automatic reset type setting button switch which energizes the release relay 50, that is, a switch which brings the system of the present invention into action.

In the wiring diagram described above, the ignition switch 60 and the low speed limit switch 62 are in the closed positions during the normal driving, so that if the setting button switch 66 is closed, the current flow from the battery 59 is admitted through the ignition switch 60, fuse box 61, low speed limit switch 62 and rectifier 58 to the main exciting coil 55 from which the current flows by way of the setting button switch 66 to the ground and back to the battery 59, whereupon the armature 67 is attracted and the main contacts 51 and 52 and the holding points 53 and 54 are closed all together. Thus, even if the setting button switch 66 is opened, the current is continuously supplied to the main exciting coil 55 through the holding contacts 53 and 54 so that the main contacts 51 and 52 continue to stay closed and the release relay 50 also remains closed. Thus, with the release relay 50 being closed, the current from the battery 59 flows through the fuse box 61 and the main contacts 51 and 52 to the exciting coils 25 and 45 of the magnetic clutches 24 and 44 and the armature of the reversible motor 43, so that the system of the present invention is brought into action. On the other hand, when a dangerous condition occurs during a journey, the brake switch 63 may be closed upon the depression of the brake pedal so that the current from the battery 59 also flows to the counter exciting coil 56 by way of the fuse box 61, brake switch 63, rectifier 57 and the holding contacts 53 and 54, whereupon the flux produced by the counter exciting coil 56 cancels out the flux produced by the main exciting coil 55 to release the armature 67 from its attracted position, and thus the main contacts 51 and 52 and the holding contacts 53 and 54 of the release relay 50 are opened all together thereby rendering the system inoperative. The depressing of the clutch pedal also closed the clutch switch 64, so that the release relay 50 is opened in a similar manner as previously described thereby rendering the system inoperative. The wiring diagram for operating the release relay 50 may be changed and modified in different ways depending upon the electric circuitry of the car in which it may be incorporated.

Figure 5:
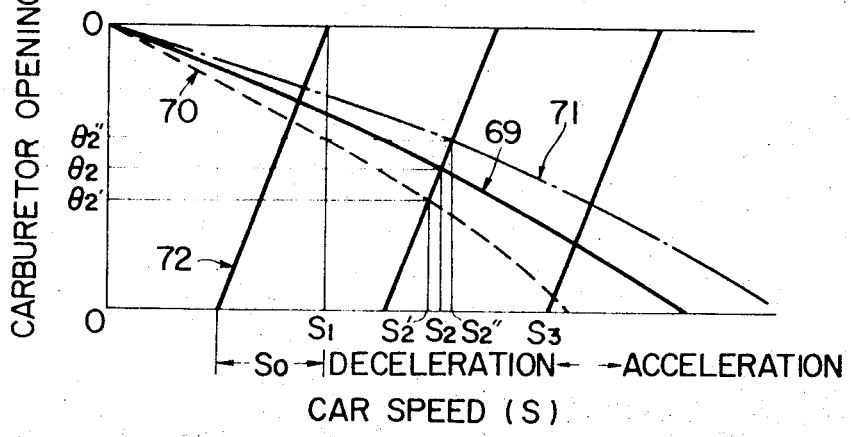
FIG. 5 is a diagram for explaining the operation of the first embodiment.

With the construction described above, the operation of the system according to the present embodiment will now be explained. FIG. 5 is a diagram for explaining the operation of the present system and in this figure the ordinate represents the carburetor throttle opening $\theta$ (the upper portion represents the fully closed position and the lower portion represents the fully opened position) and the abscissa represents the car speed S. In the figure, numeral 69 designates the carburetor opening $\theta$ — car speed S curve (hereinafter referred to as the "$\theta$–S curve") of a given car running on a level road, 70 the $\theta$–S curve when climbing a hill, 71 the $\theta$–S curve when descending a hill. An oblique line 72 represents the speed control characteristic of the system of the present invention employing a minor loop feedback, that is, this line indicates that a speed change $S_O$ is required for the carburetor throttle opening $\theta$ to change from the fully closed position to the fully opened position. This speed change $S_O$ is usually selected to be in the range between 10 to 20 Km/h.

Now, assuming that the car is running on a level road with the accelerator pedal 37 being depressed at a speed $S_2$ in the controllable speed range $S_1$ to $S_3$ of the system of the present invention as shown in FIG. 5 (where the speed $S_2$ may be any speed provided that it comes within the range $S_1$ to $S_3$), a torque is produced on the rotor 8 by the rotary magnet 2 rotating at a speed proportional to the car speed, so that the point of balance between this torque and the spiral spring 14, that is, the movable points 12 is balanced at a position $S_2$ shown in FIG. 3. In this case, since the magnetic clutch 24 is in the uncoupling position, the point base 17 carrying the acceleration and deceleration contacts 16a and 16b is operatively associated by way of the contacts 16a and 16b with the rotor 8 carrying the movable contacts 12, so that the point base 17 is also at a position proportional to the car speed as is the case with the rotor 8. On the other hand, the carburetor throttle opening $\theta$ of the carburetor 36 linked to the accelerator pedal 37 is also at a throttle position $\theta_2$ corresponding to the speed $S_2$ at that time, so that the pull-in yoke 26 side of the magnetic clutch 24 is also operatively associated with the accelerator pedal 37 through the throttle control arm 33 and the throttle control base 29 which are linked to the carburetor 36 by the link 35 and the small gear 31 mounted on the shaft 30 of the base 29 and it is thus balanced at a position corresponding to the carburetor throttle opening $\theta_2$. Thus, at this speed $S_2$ and under the conditions described above the automatic constant speed mode of driving may be achieved by merely depressing the setting button switch 66 which is installed at the driver's seat or in the steering wheel. The reason is that the main contacts 51 and 52 of the release relay 50 are closed upon the closing of the switch 66 as previously mentioned and the current from the battery 59 is branched off at a point where the current has just passed the fuse box 61 and the main contacts 51 and 52, so that one of the branched current flows to the exciting coil 25 of the speed setting magnetic clutch 24 with the result that the clutch plate 23 mounted on the point base 17 carrying the acceleration and deceleration contacts 16a and 16b is attracted to thp pull-in yoke 26 to thereby place the magnetic clutch 24 in the coupled position, whereupon at this position, i.e., the position $S_2$ of FIG. 3, the point base 17 is locked to the pull-in yoke 26 side of the magnetic clutch 24 so as to store the set speed. Consequently, the point base 17 is associated with the carburetor 36 to operate in synchronism therewith by way of the small gear 31, shaft 30, throttle control base 29, throttle control arm 33 and link 35. On the other hand, the other of the said branched current flows to the exciting coil 46 of the magnetic clutch 44 so that the clutch plate 47 disposed on the gear 42 side is attracted to the pull-in yoke 45 disposed on the gear 41 side with the result that the magnetic clutch 44 is placed in the coupling position and the gears 41 and 42 mesh with each other. As a result, the reversible motor 43 is connected with the carburetor 36 by way of the speed reducing gear system, the shaft 30, throttle control base 29, throttle control arm 33 and link 35, so that even if the driver lifts his foot from the accelerator pedal 37, the carburetor 36 will maintain its opening $\theta_2$ thereby ensuring the automatic constant speed driving. In this case, if the movable contact 12 fastened to the rotor 8 and either the acceleration contact 16a or the deceleration contact 16b of the point base 17 are closed, the reversible motor 43 will also be supplied with the current so that it rotates, but this rotation causes either the engaged contact 16a or 16b to separate from the movable contact 12 with the result that the motor 43 immediately stop rotating to thereby maintain the carburetor throttle opening $\theta_2$ constant and hence the car speed $S_2$ is maintained substantially constant.

Then, as the road conditions change such as when the vehicle comes to climb a hill so that the speed $S_2$ drops, the torque developed on the rotor 8 decreases with the result that the torque and the spiral spring 14 no longer balance with each other and the movable contact 12 now meets the acceleration contact 16a. When this happens, the forward rotating exciting coil 48 is energized through the main contacts 51 and 52 of the release relay 50 and thus the reversible motor 43 rotates in the forward direction, whereby the throttle control arm 33 is actuated by means of the speed reducing gear system so as to open the throttle valve of the carburetor 36 to correct the car speed. In this case, the rotation of the motor 43 also results in the actuation of the point base 17 by means of the magnetic clutch 44, so that the car speed is increased up to a speed $S_2'$ shown in FIG. 5 at which the acceleration contact 16a separates from the movable contact 12 and thus the motor 43 stops rotating to thereby complete the correction of the car speed. It is to be noted here that while the car speed is changed from $S_2$ to $S_2'$ owing to a minor loop feedback employed to accomplish a proportional control, the difference between the car speeds $S_2$ and $S_2'$ is normally of the order of several percent (which differs depending on the grade of the roads and the power performance of the vehicles), so that the speed $S'_2$ may be considered in practice as the constant speed of the speed $S_2$. The carburetor throttle opening in this case is $\theta'_2$.

On the other hand, when the vehicle descends a hill so that the car speed is increased, the movable contact 12 and the deceleration contact 16b are closed so that the motor 43 is actuated in the same manner as previously described so as to close the throttle valve of the carburetor 36 to correct the car speed. When this happens, the carburetor throttle opening $\theta_2$ has changed to $\theta''_2$ and the speed $S_2$ to $S''_2$.

In the automatic constant speed mode of driving described above, if it is desired to depress the accelerator pedal 37 for acceleration, the acceleration can be accomplished by simply depressing the accelerator pedal 37. In other words, this is made possible by the fact that since the throttle control arm 33 constitutes a one-way drive link mechanism by the action of the tension spring 34, only the throttle control arm 33 is actuated in association with the depression of the accelerator pedal 37 so that the component parts of the system of the present invention including the throttle control base 29 and the succeeding parts will not be driven backward by the accelerator pedal 37. Of course, the vehicle may return to its original constant speed mode of driving when the driver lifts his foot from the accelerator pedal 37.

Figure 1:
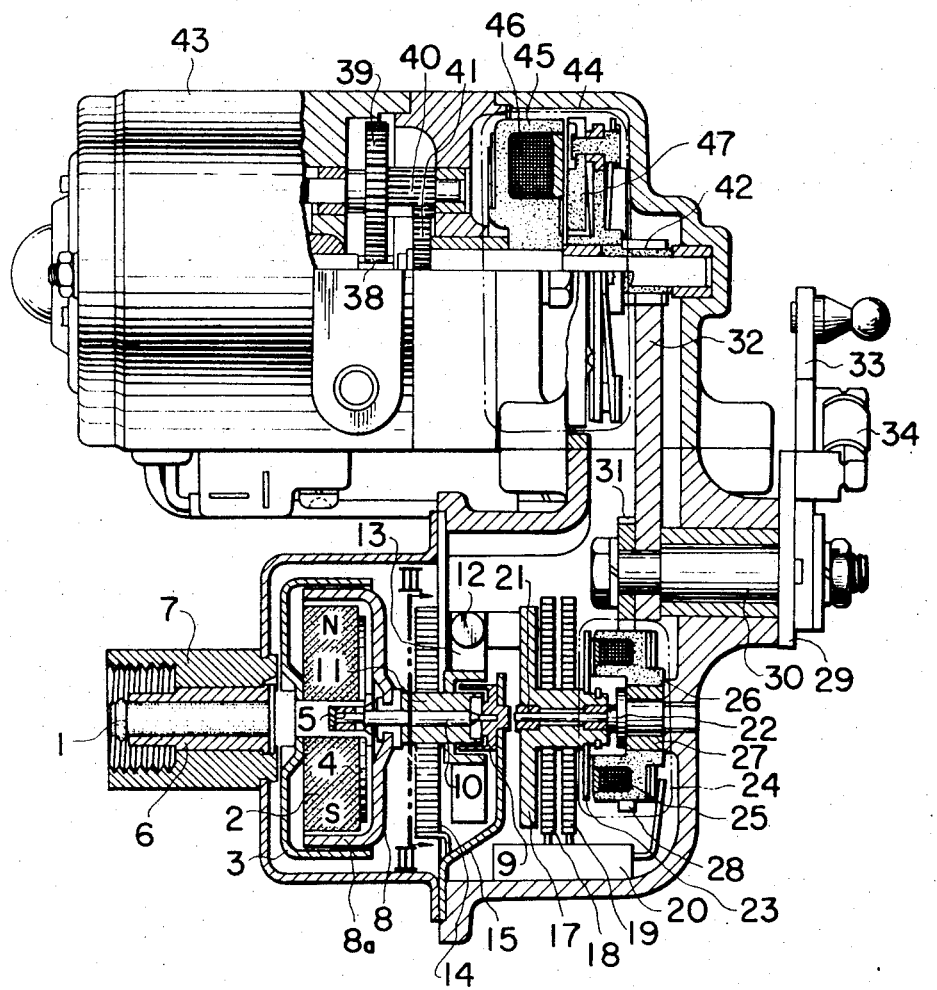
FIG. 1 is a front view showing, partly in section, a first embodiment of the automatic constant speed driving system for automobiles according to the present invention.
Figure 2:
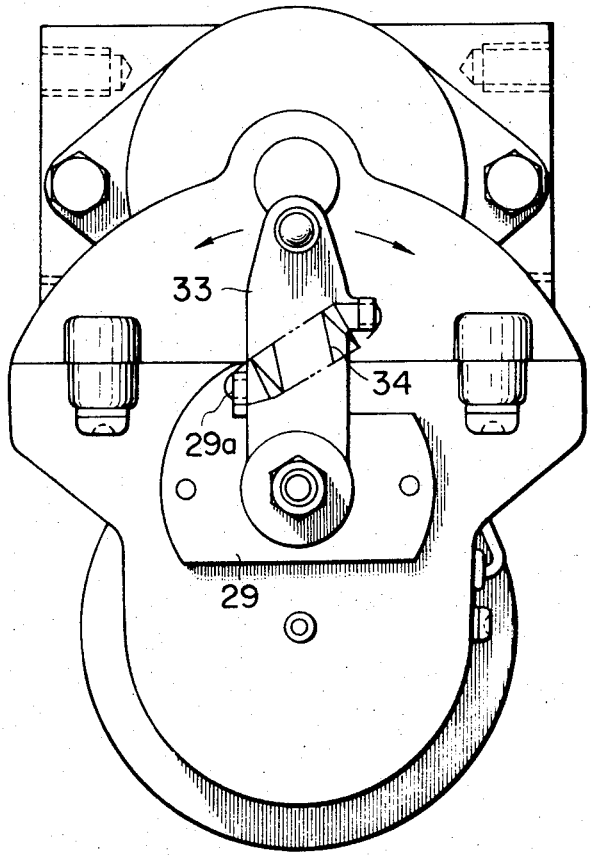
FIG. 2 is a side view of FIG. 1.

Furthermore, if a dangerous condition occurs and the driver desires to release the automatic constant speed mode of driving at will, either the brake pedal or the clutch pedal may be depressed to close the brake switch 63 or the clutch switch 64 so as to release the release relay 50, whereupon all the power sources for the system are disconnected thereby placing the vehicle back in the normal mode of driving. It is needless to say that in the embodiment described above the magnetic clutches 24 and 44 may be replaced with various other clutches such as hydraulic clutches. Moreover, although the small gear 31 and the gear 28 are shown not engaged with each other in FIG. 4 for purposes of illustration, these gears are in fact meshed with each other as shown in FIG. 1.

As described above, the system of the present embodiment comprises a speed detecting unit for producing a signal proportional to the car speed and a reversible motor is actuated by means of the signal from the detecting unit, and at the same time a clutch is provided between the reversible motor and a throttle control arm such that the clutch is held in the uncoupling position during the normal mode of driving and the clutch is engaged to control the throttle control arms by means of the reversible motor so as to place the vehicle in the constant speed mode of driving, while on the other hand a speed setting clutch adapted to be engaged at any given car speed is provided between the speed detecting unit and the throttle control arm such that upon closing the clutch the speed detecting unit is caused to store as a set speed the displacement of the throttle control arm proportional to the car speed so that the set speed is compared with the detected car speed so as to control the throttle control arm by means of the reversible motor to place the vehicle in the constant speed mode of driving. Thus, the present invention has a remarkable effect in that through a mere single touch operation of a means such as an automatic reset type button switch capable of manually engaging the said two clutches at the driver's will, these clutches can be placed in the coupled position to effect the constant speed driving of the vehicle with the car speed at that time as its set speed, whereby the operation can be considerably simplified as compared with the conventional systems in which the speed setting is accomplished by means of a dial and at the same time the speed setting can be safely effected without giving any trouble to the driving of the vehicle. There is another remarkable effect in that since such a set speed depends on the car speed at the time when the speed setting clutch is engaged, there will be no difference between the set speed and the indication of a speedometer.

Embodiment 2

Figure 6:
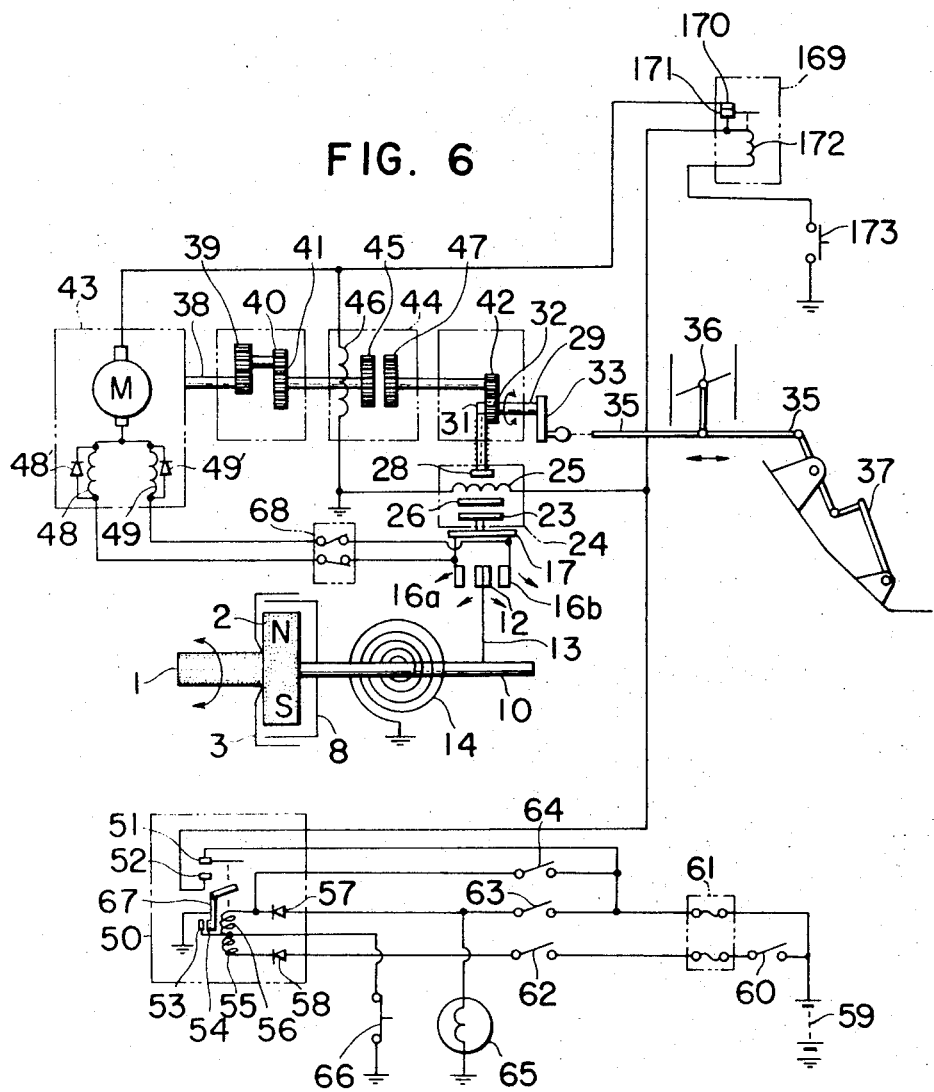
FIG. 6 is an electrical wiring diagram showing a second embodiment of the system of the present invention.

The system of a second embodiment of the present invention is identical with that of the first embodiment excepting that a speed reducing relay 169 and a speed reducing normally-open button switch 173 shown in the upper right portion of FIG. 6 are additionally provided. In the discussion to follow, only those matters which pertain to the difference will be explained.

In the wiring diagram of the present system illustrated in FIG. 6, numeral 169 designates a speed reducing relay comprising normally closed contacts 170 and 171 and an exciting coil 172, and these normally-closed contacts 170 and 171 are connected between a motor 43 and an exciting coil 46 of a magnetic clutch 44 and a main contact 52 of a release relay 50 and the exciting coil 172 is so connected that it is energized by the contact 171 through the speed reducing normally open button switch 173. The switch 173 is installed at the driver's seat, in the steering wheel or the like where it can be readily actuated by the driver.

Therefore, when it is desired to decelerate the vehicle temporarily, the speed reducing normally-open button switch 173 may be pressed to close so that the exciting coil 172 of the speed reducing relay 169 is energized and hence the normally closed contacts 171 and 170 are opened to cut off the supply of power to a motor output interrupting magnetic clutch 44 and the reversible motor 43, whereupon the automatic constant speed mode of driving is temporarily released to return the accelerator pedal 37 to its idling position and thus the car speed decelerates. In this case, however, an exciting coil 25 of a speed setting magnetic clutch 24 is energized thus placing the speed setting magnetic clutch 24 in the coupling position and therefore the speed set during the said constant speed driving is still stored. Thus, if the speed reducing button switch 173 is released to open, the vehicle is automatically accelerated up to the previously set speed $S_2$ again to thereby return the vehicle to the automatic constant speed mode of driving.

Of course, in the embodiment described above a simple switch which is manually opened and closed may also be employed in place of the speed reducing relay 169.

It is evident from the foregoing that the system just described above has a remarkable effect over that of the first embodiment in that since a magnetic clutch disposed between a motor and a throttle control arm is provided with a switch adapted to interrupt the supply of power to the clutch, the magnetic clutch may be released solely by the switch during the constant speed driving so as to decelerate the vehicle temporarily without cancelling the set speed.

Embodiment 3

Figure 7:
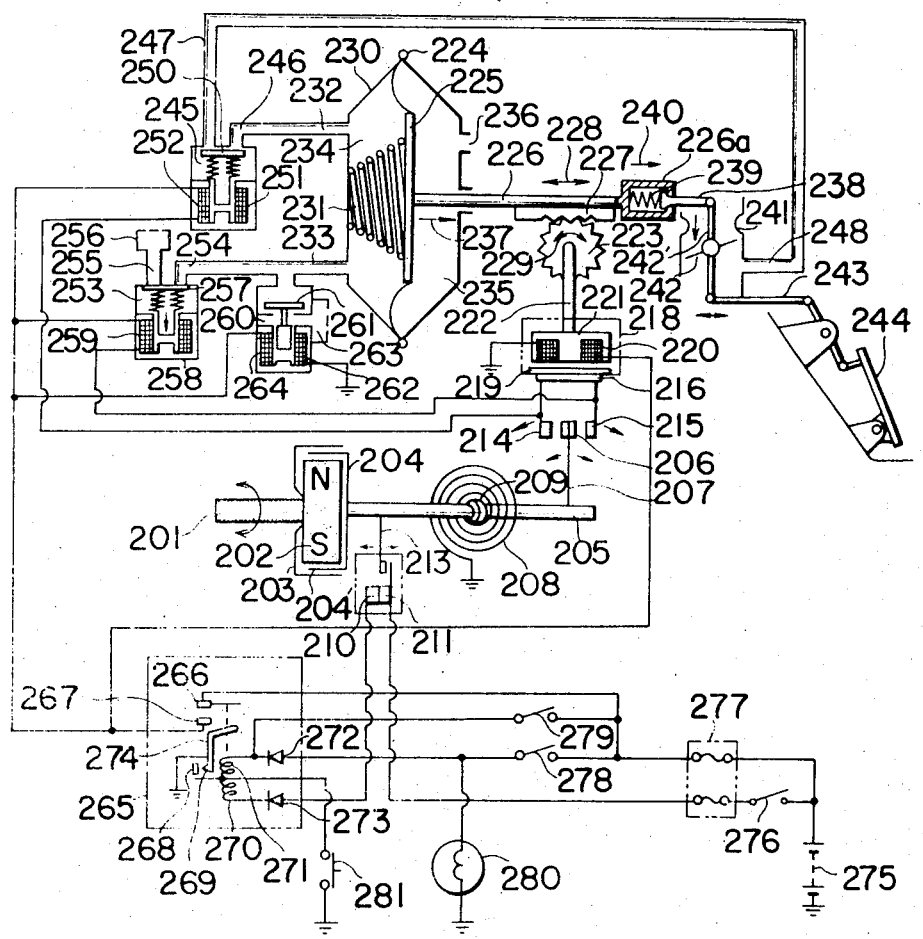
FIG. 7 is a schematic diagram showing the principles and a wiring system of a third embodiment of the system according to the present invention.
Figure 8:
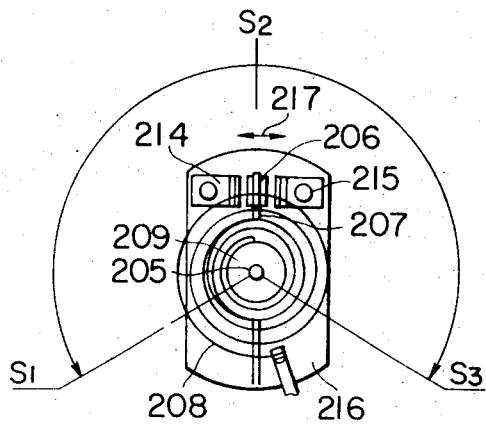
FIG. 8 is a detailed view showing, partly in section, the control contact members of the speed detecting unit.

A third embodiment of the invention will now be explained with reference to FIGS. 7 and 8 in which numeral 201 designates a magnet shaft to which a torque is transmitted from the transmission or the like through a cable to rotate it at a speed proportional to the car speed, and the magnet shaft 201 has securely mounted thereon a rotary magnet 202 which retains its magnetism by means of a suitable number of magnetic poles and a yoke 203 for providing a magnetic circuit. Numeral 204 designates a cup-shaped rotor securely mounted on a rotor shaft 205 and a cylindrical portion 204' of the rotor 204 is connected in the magnetic circuit provided by the rotary magnet 202 and the yoke 203 such that when the magnet shaft 201 rotates with the resultant rotation of the rotary magnet 202 and the yoke 203, a rotating torque is produced in the same direction of rotation as the yoke 203 and this torque is proportional to the rotational speed and caused by the eddy current. Also securely mounted on the rotor shaft 205 are an armature 207 having movable contacts 206 on the both sides thereof and a boss 209 having fastened thereon a spiral spring 208 which balances the torque produced on the rotor 204. The spiral spring 208 is also connected electrically to the armature 207 to serve as a conductor for the electric circuit and one end of its wound terminal portion is fastened for the purpose of grounding through the frame which is not shown. Then, the point of balance between the torque produced on the rotor 204 by the rotation of the magnet shaft 201 and the spiral spring 208, i.e., the contacts 12 are balanced, as shown in FIG. 8, at a position which corresponds to the car speed at that time, the car speed being in a speed range $S_1$ to $S_3$ so far as the controllable speed range is concerned. The rotor 205 has securely mounted thereon an armature 213 of a low speed safety switch 212 which has normally closed contacts 210 and 211, such that the displacement of the armature 213 at a low speed (a speed normally below 30 Km/h) opens the normally closed contacts 210 and 211 to thereby forcibly render the system of the present invention inoperative, while only at a high speed (a speed normally higher than 30 Km/h) the contacts 210 and 211 are closed. Numerals 214 and 215 designate respectively acceleration and deceleration contacts disposed opposite to the movable contacts 206 with a suitable clearance therebetween, and the two contacts are fastened to a point base 216 of an insulating material. The point base 216 is supported, as shown in FIG. 8, by a bearing (not shown) which fits into the bore of the base 216 so that the base 216 is rotatable in the direction shown by an arrow 217. The point base 216 also has mounted thereon a clutch plate 219 of a speed setting magnetic clutch 218, which is slidable in the axial direction and rotatable together with the point base 216 in the direction of rotation thereof. The magnetic clutch 218 comprises, in addition to the clutch plate 219, an exciting coil 220 and a pull-in yoke 221 such that when the magnetic clutch 218 is in the uncoupling position, the point base 216 rotates in proportion to the rotation of the magnet shaft 215 in operatively associated relation with the rotor 204 since either the acceleration contact 214 or deceleration contact 215 is urged by the movable contact 206. On the other hand, one end of the exciting coil 220 is connected to a main contact 267 of a release relay 265 which will be described later and the other end is grounded. The magnetic clutch 218 is also connected to a gear 223 by way of a shaft 222. The gear 223 is in turn meshed with a rack 227 mounted on a throttle control rod 226 fastened to a diaphragm 225 of a vacuum control mechanism 224, so that the gear 223 rotates in the direction shown by an arrow 229 in association with the movement of the throttle control rod 226 in the direction shown by an arrow 228. It is needless to say that the throttle control rod 226 and the magnetic clutch 218 need not always be operatively linked with each other by gears, but any other conventional power transmission means may be used. The vacuum control mechanism 224 comprises a casing 230 and a return spring 231 in addition to the previously mentioned diaphragm 225 and the throttle control rod 226 fastened to the diaphragm 225. The casing 230 is provided with a vacuum control pipe 232 and an air control pipe 233 such that a chamber 234 provided by the diaphragm 225 and the casing 230 is turned into an air tight chamber when the vacuum control pipe 232 and the air control pipe 233 are thoroughly closed, and the pressure in the other chamber 235 is always maintained at the same level as the atmospheric pressure by means of a port 236. Then, when the air control pipe 233 communicates with the chamber 234 so that the atmospheric pressure is admitted into the chamber 234, the diaphragm 225 is moved by the return spring 231 to its full extent in the direction shown by the arrow 237 and it rests there. The throttle control rod 226 is provided at its end opposite to the diaphragm 225 with a cylindrical portion 226a in which the end of a carburetor side control rod 238 is slidably mounted and a compression spring 239 is mounted within the cylindrical portion 226a between the said end of the rod 238 and the opposite wall of the cylindrical portion. Consequently, a pressure is applied to the carburetor side control rod 238 end by the spring 239 in the direction shown by an arrow 240 thereby pressing the control rod end against the forward inner face of the cylindrical portion 226a. In this case, the pressure applied by the spring 239 is to be greater than the pressure of the return spring 231 such that when a pressure is applied to the carburetor side control rod 238 in the direction opposite to that of the arrow 240, the compression spring 239 will not be compressed further but only the return spring 231 will be compressed through the throttle control rod 226 and the diaphragm 225. The carburetor side control rod 238 is linked to a throttle valve 242 by means of a throttle arm 242' which is in turn linked to an accelerator pedal 244 by way of a driving link 243. Numeral 245 designates a vacuum control solenoid valve which connects and disconnects two pipes 246 and 247 with each other, with the pipe 246 communicating with the vacuum control pipe 232 and the other pipe 247 communicating with a suction manifold 248 of the carburetor 241 through a flexible pipe 249. And a valve 250 provided between the two pipes 246 and 247 opens when an electromagnet 251 comprising an exciting coil 252 is energized to attract the valve 250, while the valve 250 is closed by a return spring when the electromagnet 251 is deenerigized. On the other hand, the exciting coil 252 of the electromagnet 251 has its one end connected electrically to the main contact 267 of the release relay 265 which will be discussed later and the other end is connected electrically to the acceleration contact 214. Numeral 253 designates an air control solenoid valve which connects and disconnects two pipes 254 and 255 with each other, with the pipe 254 communicating with the air control pipe 233 and the other pipe 255 open to the atmosphere by way of an air filter 256. And a valve 257 provided between the pipes 254 and 255 is designed such that the valve 257 is opened when an electromagnet 258 comprising an exciting coil 259 is energized to attract the valve 257 and the valve 257 is closed by a return spring when the electromagnet 258 is deenergized. The exciting coil 259 of the electromagnet 258 has its one end connected electrically to the main contact 267 of the release relay 265 and the other end connected electrically to the deceleration contact 215. Here, the purpose of connecting the acceleration contact to the exciting coil 252 of the vacuum control solenoid valve 545 and the deceleration contact 215 to the exciting coil 259 of the air control solenoid valve 253 is to arrange such that when the movable contact 206 engages either the acceleration contact 214 or deceleration contact 215, the engaged contact 214 or 215 rotates in association with the movement of the diaphragm 225 of the vacuum control mechanism 224 in the direction in which the engaged contact separates as will be discussed later, and the purpose of operatively associating the acceleration and deceleration contacts 214 and 215 with the diagram 225 is to employ a minor loop feedback for accomplishing the stabilized operation. Numberal 260 designates a releasing solenoid valve for controlling a quantity of air which is several times as many as the quantities controlled by the previously mentioned two solenoid valves 245 and 253, and the releasing solenoid valve 260 is disposed between the air control pipe 233 and the pipe 254 on the side of the air control solenoid valve. The solenoid valve 260 includes a valve 261, an electromagnet 260 comprising an exciting coil 262 and an air filter 263 such that when the electromagnet 260 is energized the valve 257 closes as it is attracted by the electromagnet 260, whereas when the electromagnet 260 is deenergized the valve 261 is opened by a return spring, whereby the air control pipe 233 is opened to the atmosphere through the air filter 263 even though the valve 257 of the air control solenoid valve 253 has been closed. The exciting coil 264 of the electromagnet 262 has its one end connected electrically to the main contact 267 of the release relay 265 and the other end is connected electrically to ground.

Next, the wiring diagram of the system of the present invention will be explained with reference to the lower part of FIG. 7 in which numeral 265 designates the release relay comprising main contacts 266 and 267, holding contacts 268 and 269, a main exciting coil 270, a counter exciting coil 271, rectifiers 272 and 273, etc., whereby when the system is inoperative both the main contacts 266 and 267 and the holding contacts 268 and 269 are in the open positions, whereas when the system is operative the main contact 266 meets the other main contact 267 and the holding contact 269 fastened to an armature 274 meets the other holding contact 268. Numeral 275 designates a battery, 276 an ignition switch, 277 a fuse box. Numeral 278 designates a brake switch and 279 a clutch switch which are adapted to be closed when the brake and clutch pedals are depressed, respectively. Numeral 280 designates a braking lamp and 281 an automatic reset type setting button switch for energizing the release relay 265, that is, the switch brings the system of the present invention into action.

In the wiring diagram described above, the ignition switch 276 and the low speed safety switch 212 are in the closed positions during the normal driving of the vehicle, and therefore if the setting button switch 281 is closed the current from the battery 275 flows through the ignition switch 276, fuse box 277, low speed safety switch 212, and rectifier 273 to the main exciting coil 270 from which the current flows to the ground by way of the setting button switch 281 so as to be returned to the battery 275, so that the armature 274 is attracted thus casuing both the main contacts 266 and 267 and the holding contacts 268 and 269 to close. When this happens, the main exciting coil 270 is energized through the holding contacts 268 and 269 so that even if the setting button switch 281 is opened, the main contacts 266 and 267 continue to stay closed and the release relay 265 remains in the closed position. Consequently, with the release relay 265 in the closed position, the current from the battery 275 flows through the fuse box 277, main contacts 266 and 267 to the exciting coil 220 of the magnetic clutch 218 and the exciting coil 264 of the releasing solenoid valve 260, so that the magnetic clutch 218 is engaged and tee solenoid valve 260 is closed. In this case, if the movable contact 206 is also engaged with either the acceleration contact 214 or the deceleration contact 215, the current flows through the closed contacts 214 and 206 or 215 and 206 to either the exciting coil 252 of the vacuum control solenoid valve 45 of the exciting coil 259 of the air control solenoid valve 253 so that the system of the present invention is set into operation. Then, when a dangerous condition occurs while the vehicle is being driven, the brake pedal may be depressed to close the brake switch 278, the current from the battery 275 also flows to the counter exciting coil 271 by way of the fuse box 277, brake switch 278, rectifier 272 and the holding contacts 269 and 268, whereupon the magnetic flux of the counter exciting coil 271 and that of the main exciting coil 270 cancel each other so that the attraction of the armature 274 is released and thus the main contacts 266 and 267 and the holding contacts 268 and 269 of the release relay 265 are opened to thereby render the system inoperative. Besides, the clutch pedal may be pressed to close the clutch switch 279 so that the release relay 265 is released in the same manner as described above to thereby render the system inoperative. Furthermore, the electric circuit for operating the release relay 265 may be modified in various ways depending on the electric circuitry of a vehicle incorporating the relay.

Figure 9:
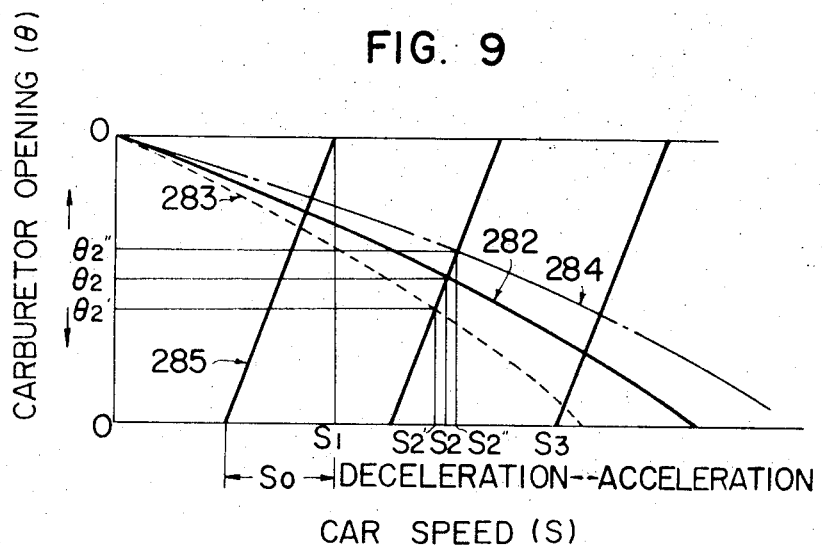
FIG. 9 is a diagram for explaining the operation of the third embodiment.

The operation of the system of the present invention constructed as described above will now be explained with reference to FIG. 9 which illustrates a diagram for explaining theoperation of the present system. In the figure, the ordinate represents the carburetor throttle opening $\theta$ (where the upper portion represents the fully closed position and the lower portion represents the fully opened position) and the abscissa represents the car speed S, while numeral 282 designates the carburetor throttle opening $\theta$-car speed S curve (hereinafter referred to as the "$\theta$-S curve") of a given car running on a level road, 283 the $\theta$-S curve when climbing a hill, and 284 the $\theta$-S curve when descending a hill. An oblique line 285 represents the speed control characteristic of the system of the present invention employing a minor loop feedback, that is, the line indicates that a speed change $S_0$ is necessary in order that the carburetor throttle opening $\zeta$ may change from the fully closed throttle to the wide open throttle. This speed change $S_0$ is generally chosen to fall between 10 to 20 Km/h. Now assuming that as shown in FIG. 9, with the accelerator pedal 244 being depressed the vehicle is normally running on a level road at a speed $S_2$ which is within the controllable speed range $S_1$ to $S_3$ of the system (where the speed $S_2$ may be any speed provided that it is between the speeds $S_1$ to $S_3$), the point of balance between the torque produced on the rotor 204 by the rotary magnet 202 and the spiral spring 208, that is, the movable contacts 206 are balanced at a position $S_2$ shown in FIG. 8. In this case, since the magnetic clutch 218 is in the uncoupling position, the point base 216 having fastened thereto the acceleration and deceleration contacts 214 and 215 is operatively associated with the rotor 204 having the movable contacts 206 through the contacts 214 and 215, so that the point base 216 is in a position proportional to the car speed as is the case with the rotor 204. On the other hand, the carburetor throttle opening $\theta$ of the carburetor 241 linked to the accelerator pedal 244 and the link 243 assumes an opening $\theta_2$ which corresponds to a car speed $S_2$ at that time, so that the gear 223 meshes with the rack 227 of the throttle control rod 226 which is linked to the carburetor 241 by way of the carburetor side control rod 238 and the compression spring 239 and thus the pull-in yoke 221 side of the magnetic clutch 218 connected to the gear 223 by the shaft 222 is also rotated to and balanced at a position corresponding to the carburetor throttle opening $\theta_2$. At this time, the diaphragm 225 mounted on the throttle control rod 226 is operatively associated with the accelerator pedal 244 to move freely since the valve 261 of the releasing solenoid valve 260 is opened. Thus, in order for the driver to change the mode of driving to the automatic constant speed driving mode the setting button switch 281 which is installed by the driver's seat or in the steering wheel may be simply depressed. In other words, as the switch 281 is turned on, the main contacts 266 and 267 of the release relay 265 close and the current from the battery 275 is branched off at a point past the fuse box 277 and the main contacts 266 and 267, so that one of the branched current flows to the exciting coil 220 of the speed setting magnetic clutch 218 and thus the clutch plate 219 mounted on the point base 216 carrying the acceleration and deceleration contacts 214 and 215 is attracted to the pull-in yoke 221 to engage the magnetic clutch 218, whereupon the point base 216 is held against the pull-in yoke 221 side of the magnetic clutch 218 at a position $S_2$ shown in FIG. 9 so as to store the set speed. Then, the point base 216 operates is synchronization with the carburetor throttle opening $\theta_2$ by way of the shaft 222, gears 223 and 227, throttle control rod 226, compression spring 239 and carburetor side control rod 238. On the other hand, the other of the branched current flows to the exciting coil 264 of the releasing solenoid valve 260 to close the valve 261 so that the chamber 234 of the vacuum control mechanism 224 is cut off from the atmosphere rendering the chamber 234 air tight. Consequently, if at this time the driver lifts his foot from the accelerator pedal 244, the diaphragm 225 within the casing 230 tends to move in the direction shown by the arrow 237 by virtue of the return spring 231. In fact, however, the diaphragm 225 is set into a stationary state at this position because the air pressure in the chamber 234 will become lower than the atmospheric pressure if the diaphragm 225 moves in that direction, so that the degree of opening of the throttle valve 242 linked to the diaphragm 225 by way of the throttle control rod 226 and the carburetor side control rod 238 is held constant and the vehicle enters into the automatic constant speed mode of driving. In this case, if the movable contact 206 is engaged with either the acceleration contact 214 or the deceleration contact 215, either the vacuum control solenoid valve 245 or the air control solenoid valve 253 is energized to open so that an air pressure change occurs in the chamber 234 to displace the diaphragm 226 and the throttle control rod 226 is thus actuated. When this happens, the point base 216 moves in a direction such that either the contact 214 or the contact 215 engaging the movable contact 206 is separated from the contact 206 with the result that either the solenoid valve 248 or 253 immediately deenergized and hence the disphragm 225 is also held stationary thereby maintianing the speed $S_2$ substantially constant.

Then, as the road conditions change such as when the vehicle comes to climb a hill and the car speed decreases, the torque developed on the rotor 204 is decreased so that the balance between the torque and the spiral spring 208 is upset to cause the movable contact 206 to engage the acceleration contact 214. Similarly as described above, this opens the vacuum control solenoid valve 245 so that the air in the chamber 234 of the casing 230 is received by the intake manifold 248 via the pipes 232, 246, 247 and 249 and the diaphragm 225 is thus displaced in the direction opposite to that of the arrow 237, whereby the throttle valve 242 is opened by way of the throttle control rods 226 and 238 to correct the car speed. In this case, the point base 216 is also actuated by way of the gears 227 and 223, the shaft 222 and the magnetic clutch 218 upon movement of the throttle control rod 226, so that as the car speed is increased to reach a speed $S'_2$ shown in FIG. 9, the acceleration contact 214 mounted on the point base 216 is disengaged from the movable contact 206 and the vacuum control solenoid valve 245 is thus deenergized, whereupon the solenoid valve 245 is closed and the diaphragm 225 becomes stationary at this point thereby completing the correction of the car speed. While, at this time, the car speed changes from $S_2$ to $S'_2$ because of a proportion control provided through the utilization of a minor loop feedback, the difference between the two speeds $S_2$ and $S'_2$ is normally not more than several percent (this percentage differs with different road grades and different power performances of vehicles) and thus the speed $S'_2$ may be considered to be practically the constant speed of the speed $S_2$. In this case, the carburetor throttle opening has changed to $\theta'_2$.

On the other hand, when the vehicle is going downhill so that the car increases speed, the movable contact 206 engages the deceleration contact 215 and the air control solenoid valve 253 is energized to open the valve 257 thus admitting air into the chamber 234, whereupon the diaphragm 225 is displaced in the direction shown by the arrow 237 and hence the throttle valve 242 is closed to correct the car speed. In this case, the points of balance for the car speed and the carburetor throttle opening are $S''_2$ and $\theta''_2$, respectively, as shown in FIG. 9.

Furthermore, if the driver desires to depress the accelerator pedal 244 for acceleration during the automatic constant speed driving described above, the driver may simply depress the accelerator pedal 244 so as to accomplish acceleration. In other words, although the throttle arm 242' is actuated by the accelerator pedal 244 to open the throttle valve 242, the carburetor side control rod 238 merely moves within the cylindrical portion 226a of the throttle control rod 226 against the compression spring 239 with respect to the rod 226, so that the system of the present invention will not be actuated backward. Of course, the driver may resume the automatic constant speed mode of driving by simply lifting his foot from the accelerator pedal 244.

Then, in the event that a dangerous condition occurs or the driver desired to release the automatic constant speed mode of driving at will, either the brake pedal or the clutch pedal may be depressed to close either the brake switch 278 or the clutch switch 279 for releasing the release relay 265, whereby the releasing solenoid valve 260 is deenergized to open the valve 261 and thus the chamber 234 of the casing 230 is opened to the atmosphere. When this happens, the diaphragm 225 is rendered freely movable by viture of the driving force transmitted from the accelerator pedal 244 so that throttle valve 242 is now controlled by the driving force from the accelerator pedal 244 thereby changing the mode of driving to the normal driving mode.

It is now evident from the foregoing that according to the present system, either a vacuum control solenoid valve or an air control solenoid valve disposed in a pipe communicating with the first chamber in a vacuum control mechanism is actuated by the signal from a speed detecting unit which compares a signal proportional to the car speed with a set speed, so that the air pressure in the chamber is changed to thereby cause the displacement of a diaphragm disposed between the second chamber which always maintains the atmospheric pressure therein and the first chamber in accordance with the air pressure change in the first chamber so as to control a throttle control rod for driving the vehicle at a constant speed. Thus, as compared with the conventional systems wherein the carburetor throttle opening is controlled by means of a reversible motor, the consumption of electric power may be considerably reduced in the present system since it utilizes the engine manifold vacuum and the atmospheric pressure and at the same time the first chamber is communicated with the atmosphere by way of a releasing solenoid valve such that the first chamber is opened to the atmosphere upon the opening of the releasing solenoid valve and hence the diaphragm is set free thus releasing the automatic constant speed mode of driving. This results in a remarkable effect in that such complicate mechanisms as a reversible motor, a magnetic clutch for interrupting the output of the reversible motor and a speed reducing mechanism may be eliminated altogether thereby achieving a simplicity in construction, minaturization and reduced cost of the system. In addition, according to the present system a speed setting magnetic clutch engageable at any given car speed is provided between a speed detecting unit and a throttle control rod such that upon engagement of the clutch the speed detecting unit stores as a set speed the displacement of the throttle control rod corresponding to the car speed, whereby only through a single touch operation of some means capable of freely and manually engaging the speed setting magnetic clutch, such as, an automatic reset type switch, the automatic constant speed driving of the vehicle can be acomplished with the car speed at that time as its set speed. Thus, there is a remarkable effect in that the operation of the present system can be considerably simplified as compared with the conventional systems employing a dial for speed setting purposes and at the same time the required speed setting can be accomplished safely without any interference with driving the car. There is a further remarkable effect in that since the setting of a speed depends on the car speed at a time when the speed setting magnetic clutch is engaged, the speed indicated on a speedometer can be directly set as a set speed thereby eliminating the occurrence of any error between the set speed and the indication of the speedometer.

Embodiment 4

The system according to a fourth embodiment of the invention is identical with that of the third embodiment excepting that a speed reducing relay 382 and a speed reducing normally-open switch 386 are additionally provided as illustrated in the lower left portion of FIG. 10, and therefore only those matters which relate to this difference will now be explained.

In FIG. 10, an exciting coil 252 of an electromagnet 251 has its one end electrically connected to a main contact 267 of a release relay 265 by way of normally closed contacts 383 and 384 of the speed reducing relay 382 and the other end to an acceleration contact 214. On the other hand, one end of an exciting coil 259 of an electromagnet 258 is electrically connected to the main contact 267 of the release relay 265 by way of the contacts 383 and 384 of the speed reducing relay 382 and the other end to a deceleration contact 215. In addition, one end of an exciting coil 264 of an electromagnet 262 is electrically connected to the main contact 267 of the release relay 265 by way of the contacts 383 and 384 of the speed reducing relay 382 and the other end is electrically grounded. The speed reducing relay 382 comprises the normally closed contacts 383 and 384 and an exciting coil 385 with the contact 383 being connected to the respective exciting coils 252, 259 and 264 of a vacuum control solenoid valve 245, an air control solenoid valve 253 and a releasing solenoid valve 260 and the contact 384 being connected to the main contact 267 of the release relay 265. The exciting coil 385 has its one end connected to the contact 384 and its other end grounded by way of the speed reducing normally-opened switch 386. The speed reducing normally-open switch 386 is installed at the driver's seat or in the steering wheel such that when it is desired to temporarily reduce the speed during the automatic constant speed driving, the normally closed contacts 383 and 384 of the relay 382 may be opened.

Accordingly, in order to temporarily reduce the speed during the automatic constant speed driving, the speed reducing normally-open switch 386 i pressed to close the switch so that the closing of the switch 386 energizes the exciting coil 385 of the speed reducing relay 382 to open the normally closed contacts 383 and 384 so as to cut off the supply of electric power to the vacuum control solenoid valve 245, air control solenoid valve 253 and releasing solenoid valve 260, whereupon a chamber 234 is opened to the atmosphere to introduce the atmospheric pressure thereinto as a valve 261 of the releasing solenoid valve 260 is opened and thus the automatic constant speed mode of driving is released with the result that an accelerator pedal 244 returns to its idling position and the car speed decreases. In this case, however, an exciting coil 220 of a speed setting magnetic clutch 218 is energized by the main contacts 266 and 267 of the release relay 265 and the speed setting magnetic clutch 218 is thus in the coupling position, whereby since the set speed during the previous constant speed mode of driving is stored in a point base 216, the speed reducing normally-open switch 386 may be reopened to automatically accelerate the vehicle again up to the previously set speed $S_2$ thereby resuming the automatic constant speed mode of driving.

It is self-evident that simple manually operated switches may be used in place of the speed reducing relay 382 and the speed reducing normally-open switch 386 so as to temporarily reduce the car speed without cancelling the set speed in the similar manner as described above.

Thus, the system of the present embodiment achieves greater effectiveness in that since switches are provided at least to place a releasing solenoid valve into its released position without disengaging the speed setting magnetic clutch, the switches may be operated during the constant speed driving so that the releasing solenoid valve is opened to render a diaphragm freely movable so as to decelerate the vehicle, while at the same time the set speed during the constant speed driving is still stored since the speed setting magnetic clutch remains in the coupling position and thus the releasing solenoid valve may be closed again by means of the switches so that the vehicle is automatically accelerated up to the set speed to resume the constant speed mode of driving, thereby enabling the driver to temporarily reduce the speed by means of the switches without cancelling the set speed.

I claim:

1. An automatic constant speed driving system for automobiles comprising:
  a speed detecting unit for producing a signal proportional to the car speed, said speed detecting unit comprises a rotary magnet rotated at a speed proportional to the car speed, a rotor magnetically linked with the rotary magnet and being displaced rotationally about the aixs thereof depending on the car speed, and contact means having movable contacts fixed to the rotor, the displacement of said movable contacts due to the displacement of the rotor being indicative of the car speed;
  means for actuating an engine throttle;
  and a speed setting magnetic clutch for interconnecting said speed detecting unit and said means for actuating an engine throttle at any given car speed, said speed setting magnetic clutch comprises a rotational pull-in yoke linked mechanically with said means for actuating an engine throttle, a clutch plate having a pair of contacts mounted thereon, said pair of contacts being placed opposite to said movable contacts of said speed detecting unit, and an exciting coil for causing said pull-in yoke and said clutch plate to engage in actuation of said magnetic clutch, where by when said magnetic clutch is not actuated said clutch plate is rotationally displaced upon engagement of said movable contacts with either of said pair of contacts depending on the rotational displacement of said rotor,
  when said magnetic clutch is energized and the clutch plate together with the pair of fixed contacts is pulled to the pull-in yoke, the displacement of said throttle actuating means corresponding to the car speed is stored as a set speed, and said set speed is compared with the detected speed to operate said throttle actuating means for effecting the motion of the throttle and at the same time the rotational displacement of the pair of contacts together with the clutch plate for achieving the constant speed driving of the vehicle.

2. An automatic constant speed driving system for automobiles according to claim 1, wherein said engine throttle actuating means include a reversible motor and a driving force on-off clutch such that during the normal driving said reversible motor, said driving force on-off clutch and said speed setting magnetic clutch are in the released position, and during the constant speed driving said three elements are energized to permit the transmission of the driving force of said reversible motor to the engine throttle.

3. An automatic constant speed driving system for automobiles according to claim 2, wherein said driving force on-off clutch in said engine throttle actuating means consists of a magnetic clutch and there are further provided switching means for switching on and off the current supply to said reversible motor and said driving force on-off clutch, whereby only said reversible motor and said driving force on-off magnetic clutch are released upon the actuation of said switching means so as to temporarily reduce the speed even during constant speed driving.

4. An automatic constant speed driving system for automobiles according to claim 1, wherein said means for actuating an engine throttle comprises:
   a reversible motor for driving the throttle of the engine, said motor being connected electrically with said pair of contacts and said movable contacts for controlling the direction of rotation,
   a driving force on-off clutch consisting of a magnetic clutch for transmitting a driving force of said reversible motor to the engine throttle, said driving force on-off clutch being energized only during the automatic constant speed mode of driving thereby to permit the transmission of the driving force of said reversible motor to the engine throttle, and
   switching means for switching on and off the current supply to said reversible motor and said driving force on-off clutch, whereby upon actuation of said switching means only said reversible motor and said driving force on-off magnetic clutch are released while leaving said speed setting magnetic clutch energized so as to temporarily release the automatic constant speed mode of driving and to reduce the car speed to its idling speed.

5. An automatic constant speed driving system for automobiles according to Claim 6, wherein said means for actuating an engine throttle comprises:
   a vacuum control mechanism having two chambers separated by a diaphragm, one of said two chambers being communicated with a suction manifold of the engine carburetor and with the atmosphere respectively through pipes, the other chamber being opened to the atmosphere,
   a throttle control rod having one end fixed to said diaphragm,
   a vacuum control solenoid valve connected in said pipe between said one chamber and said suction manifold of the engine carburetor, said vacuum control solenoid valve being energizable through one of said pair of contacts of said speed setting magnetic clutch and said movable contacts of said speed detecting unit,
   an air control solenoid valve connected in said pipe between said one chamber and the atmosphere, said air control solenoid valve being energizable through the other of said pair of contacts of said speed setting magnetic clutch and said movable contacts of said speed detecting unit,
   thereby when said movable contacts are engaged with one or the other of said pair of contacts, said vacuum control valve is opened or closed, while said air control valve is closed or opened, causing said diaphragm and hence, said throttle control rod to move either to accelerate or decelerate the car speed.

6. An automatic constant speed driving system for automobiles according to claim 8 wherein said means for actuating an engine throttle furthecomprising:
   switching means for switching on and off the current supply to said vacuum control solenoid valve and said air control solenoid valve, whereby upon actuation of said switching neans said vacuum control solenoid valve and said air control solenoid valve are de-energized so as to open said one chamber to the atmosphere releasing temporarily the automatic constant speed mode of driving and to reduce the car speed to its idling speed.

* * * * *

UNITED STATES PATENT OFFICE
CERTIFICATE OF CORRECTION

Patent No. 3,727,714    Dated April 17, 1973

Inventor(s) Toshio Ishikawa

It is certified that error appears in the above-identified patent and that said Letters Patent are hereby corrected as shown below:

In the heading:

Item [73], change "Nippondenso Kabrishiki Kaisha" to
-- Nippondenso Kabushiki Kaisha --.

Signed and sealed this 18th day of December 1973.

(SEAL)
Attest:

EDWARD M. FLETCHER, JR.
Attesting Officer

RENE D. TEGTMEYER
Acting Commissioner of Patents